US012001980B2

(12) United States Patent
Gamliel et al.

(10) Patent No.: US 12,001,980 B2
(45) Date of Patent: Jun. 4, 2024

(54) DATA-DRIVEN ORGANIZATION ADJUSTMENT

(71) Applicant: Dell Products L.P., Round Rock, TX (US)

(72) Inventors: Roi Gamliel, Moshav Tkuma (IL); Avitan Gefen, Tel Aviv (IL)

(73) Assignee: DELL PRODUCTS L.P., Round Rock, TX (US)

( * ) Notice: Subject to any disclaimer, the term of this patent is extended or adjusted under 35 U.S.C. 154(b) by 417 days.

(21) Appl. No.: 17/164,036

(22) Filed: Feb. 1, 2021

(65) Prior Publication Data

US 2022/0245544 A1  Aug. 4, 2022

(51) Int. Cl.
*G06Q 10/0631* (2023.01)
*G06F 9/54* (2006.01)
*G06F 16/245* (2019.01)
*G06F 21/31* (2013.01)
*G06Q 10/0633* (2023.01)

(52) U.S. Cl.
CPC ......... *G06Q 10/06312* (2013.01); *G06F 9/54* (2013.01); *G06F 16/245* (2019.01); *G06F 21/31* (2013.01); *G06Q 10/0633* (2013.01)

(58) Field of Classification Search
CPC .............................................. G06Q 10/06312
See application file for complete search history.

(56) References Cited

U.S. PATENT DOCUMENTS

| 9,491,035 | B1 | 11/2016 | Pauley et al. |
| 2012/0265569 | A1 | 10/2012 | Gonzalez-Diaz et al. |
| 2014/0074545 | A1 | 3/2014 | Minder et al. |
| 2014/0101168 | A1 | 4/2014 | Bayliss |
| 2017/0123604 | A1 | 5/2017 | Kone et al. |
| 2018/0069806 | A1* | 3/2018 | Kumar .................. H04L 47/827 |
| 2018/0082240 | A1 | 3/2018 | Meyerzon et al. |
| 2018/0174104 | A1* | 6/2018 | Schikora .............. G06Q 10/103 |
| 2019/0188049 | A1 | 6/2019 | Choudhary et al. |
| 2019/0347668 | A1* | 11/2019 | Williams ................ H04L 51/02 |
| 2020/0160190 | A1* | 5/2020 | Swamy ................. G06F 40/279 |
| 2020/0236009 | A1* | 7/2020 | Meyer ................. H04L 41/0806 |
| 2020/0371896 | A1 | 11/2020 | Mathur et al. |

(Continued)

OTHER PUBLICATIONS

Chelmis et al., Semantic Social Network Analysis for an Enterprise, Computing and Informatics, vol. 33, 2014, 479-502 (Year: 2014).*

(Continued)

*Primary Examiner* — Andre D Boyce

(74) *Attorney, Agent, or Firm* — Amin, Turocy & Watson, LLP

(57) ABSTRACT

Techniques are provided for data-driven organization adjustment. In an example, a service mesh of microservices of a platform can be determined. An organizational chart of workers in an organization that maintain the microservices can be determined. Which workers manage which microservices can be determined from a repository in which code for the microservices is maintained. Then, the organizational chart can be analyzed to determine whether workers are organized in a way that meets policies based on which microservices they manage. For example, a policy can be that all workers who manage a given microservice should report to the same manager in the organization.

20 Claims, 15 Drawing Sheets

(56) References Cited

U.S. PATENT DOCUMENTS

| | | | |
|---|---|---|---|
| 2021/0124577 A1 | 4/2021 | Gupta | |
| 2021/0150056 A1* | 5/2021 | Vax | G06F 16/9024 |
| 2021/0152659 A1 | 5/2021 | Cai et al. | |
| 2021/0182069 A1* | 6/2021 | Upadhyaya | G06F 9/3851 |
| 2021/0216444 A1* | 7/2021 | Gefen | G06F 11/3688 |
| 2022/0180215 A1* | 6/2022 | Kumar | G06F 16/953 |
| 2022/0191168 A1* | 6/2022 | Snehashis | H04L 41/22 |
| 2023/0015670 A1* | 1/2023 | Wolpoff | G06F 9/5061 |

OTHER PUBLICATIONS

Wikipedia | Centrality, https://en.wikipedia.org/wiki/Centrality, 15 pages.
Wikipedia | Conways' Law, https://en.wikipedia.org/wiki/Conway%27s_law, 2 pages.
Wikipedia | Modular programming, https://en.wikipedia.org/wiki/Modular_programming, 3 pages.
Burgan, Darrel | Microservices and Conway's Law, https://dzone.com/articles/microservices-and-conways-law, 4 pages.
Github | About code owners, https://docs.github.com/en/github/creating-cloning-and-archiving-repositories/about-code-owners#about-code-owners, 4 pages.
Office Action dated Feb. 14, 2022 for U.S. Appl. No. 17/193,940, 60 pages.
Final Office Action dated Aug. 5, 2022 for U.S. Appl. No. 17/193,940, 73 pages.
MacDonald, Andy. "Chaos Engineering: Chaos Testing Your HTTP Micro-Services—Failing to Succeed and Succeeding at Failing" Medium. May 20. 2019. Published online at [https://betterprogramming.pub/chaos-engineering-chaos-testing-your-http-micro-services-acc99d145515], retrived Jan. 30, 2022, 8 pages.
Office Action dated Oct. 15, 2021 for U.S. Appl. No. 17/086,540, 33 pages.
Notice of Allowance dated Feb. 11, 2022 for U.S. Appl. No. 17/086,540, 19 pgs.
Office Action dated Jan. 17, 2023 for U.S. Appl. No. 17/193,940, 68 pages.
Notice of Allowance dated Jun. 7, 2023 for U.S. Appl. No. 17/193,940, 38 pages.

* cited by examiner

900

Mset(W1) = {}
Mset(W2) = {}
Mset(W3) = {MS1}
Mset(W4) = {MS5}
Mset(W5) = {MS1}
Mset(W6) = {MS1}
Mset(W7) = {}
Mset(W8) = {MS2}
Mset(W9) = {MS5}
Mset(W10) = {MS2}
Mset(W11) = {MS3}
Mset(W12) = {MS5}
Mset(W13) = {MS3}
Mset(W14) = {}
Mset(W15) = {MS4}
Mset(W16) = {MS4}
Mset(W17) = {MS4}

Wset(MS1) = {W3,W5,W6}
Wset(MS2) = {W8,W10}
Wset(MS3) = {W11,W13}
Wset(MS4) = {W15,W16,W17}
Wset(MS5) = {W4,W9,W12}

FIG. 10

DATA-DRIVEN ORGANIZATION ADJUSTMENT

TECHNICAL FIELD

The present application relates generally to analyzing a plurality of inter-related microservices and a structure of development teams that build and maintain those microservices.

BACKGROUND

Microservices can generally be a variant of a service-oriented architecture (SOA) computer architectural style that structures an application as a collection of loosely coupled services. A benefit of decomposing an application into different, smaller services can be that it can improve modularity and make an application easier to understand, develop, and test. Such an approach can also parallelize development by permitting small, autonomous teams to develop, deploy, and scale their respective services independently. It is possible that each microservice of a system is developed and deployed independently—perhaps hundreds of times a day. Furthermore, microservices can be polyglot, and developed using different technology stacks (e.g., a programming language, and measured persistent technology).

Microservices can be deployed as part of a software as a service (SaaS) model, where a system of microservices is centrally hosted, is accessed by a thin client (e.g., a web browser), and is expected to be operational at all times. Operational up time can be measured by availability. Availability can be a measure of a system that identifies whether a user is able to use the service when he needs to use it. In SaaS architectures, availability can be measured by uptime, to which 99.999% ("five 9s") uptime is aspired.

As to organizations of people that develop and maintain microservices, "Conway's law" states that, "Any organization that designs a system (defined broadly) will produce a design whose structure is a copy of the organization's communication structure." An underpinning of this idea is that, in order for software to function properly, multiple authors will likely communicate with each other to create it. Given that, a software interface can reflect social boundaries of an organization the produces the software, where communication across these boundaries is more difficult than communication within the organization.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 9 illustrates an example association of microservices to a particular worker that can facilitate data-driven organization adjustment, in accordance with certain embodiments of this disclosure;

FIG. 10 illustrates an example association of workers to a particular microservice that can facilitate data-driven organization adjustment, in accordance with certain embodiments of this disclosure;

DETAILED DESCRIPTION

Overview

Figure 1:
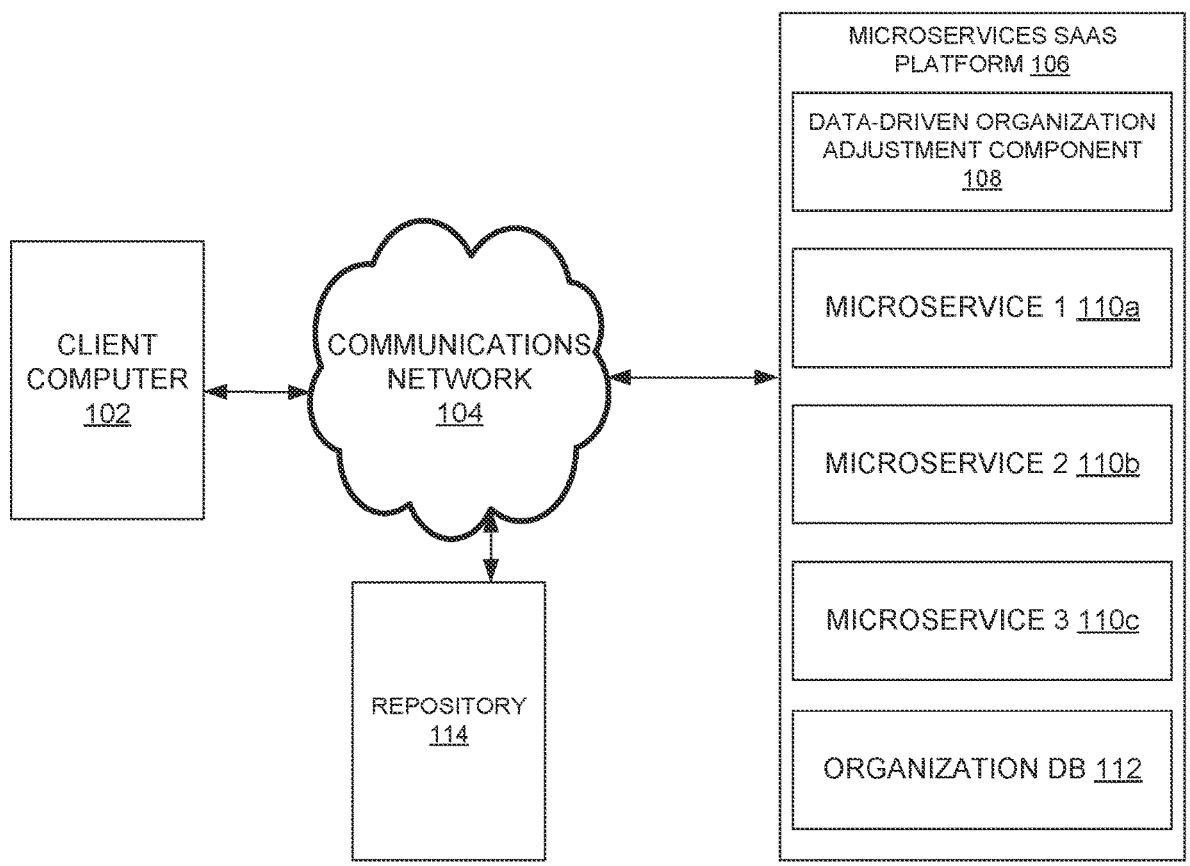
FIG. 1 illustrates an example system architecture that can facilitate data-driven organization adjustment, in accordance with certain embodiments of this disclosure.

Conway's law can be used to explain issues of working in cross-organizational teams on a single product, or a microservice. It can be said that, if you want to change your software architecture, you must first reorganize your teams. Even with respect to modern methodologies, and modern management tools, it can be better to adjust an organization to reflect the structure that software is wished to possess, rather than force a difference between a structure of an organization and a structure of the software it produces.

The present techniques can provide for improving an alignment between an organizational structure and a microservices architecture. Both a system's service mesh and an organizational network can be analyzed. Graphical analysis over application programming interface (API) dependencies in a microservice environment can be performed, along with automatic detection of code ownership, to identify where there is mis-alignment between application structure and organizational structure, and organizational action can be taken.

An organization that creates software can be built out of teams, structured in an organized manner with clear hierarchy. The structure of the organization can fundamentally affect the end-product.

In order to increase team velocity and autonomy when delivering software in a SaaS model, the industry has commonly adopted a development operations ("DevOps") approach. This means that each microservice can be developed and maintained by a single team, where the team is responsible for each aspect of the microservice, from development, to testing, deployment, performance and more.

A mis-alignment between an organization structure and a software structure can cause development and product problems, due to miscommunication, a difference in motivation, culture, workflows, and more.

To address the above problems, the present techniques can be implemented to improve the alignment between the organization structure and the microservice architecture. These techniques can involve analyzing the system's service mesh and the organization network. These approaches can utilize graphical analysis over API dependencies in a microservice environment and automatic detection of code ownership to identify where misalignment of the organizational chart occurs.

An organization structure can generally comprise a network of hierarchies where workers are connected to those who they report to. This structure can show a flow of motivation that comes from management, as well as the organizational distance between different workers. The network structure can be augmented with information such as geographical or site location, language, and more. An organizational graph structure can represent the organization and interrelations between workers. A directed edge (u, v) in the organizational graph can represent the fact that worker v reports to worker u.

To determine which worker owns which microservice, a node of a worker in an organizational graph can be mapped to a microservice that worker is working on in a service mesh.

Computer code for a microservice can be maintained using version control tools and management tools, which can be utilized to identify code owners. Management tools can be utilized to determine one or more code owners for a microservice. From this, for each worker, a set of microservices owned by that worker can be generated. In some examples, one worker can map to multiple microservices.

An organizational distance between two workers (org-distance(w1,w2)) can be considered to be a length of a shortest undirected path from w1 to w2 in the organizational graph.

Using organizational distance, unmet constraints or policies in an organizational graph can be determined. For example, a policy can state that all the workers who work on some microservice M will be in the same team, so an organizational distance threshold of 2 can be set. That can indicate that all workers who work on M should report to the same manager. This policy can be relaxed, e.g., to 3 or 4, to permit workers from different teams to work on a microservice.

An approach for identifying organizational misalignment can be:
For each microservice
    Wset(M) holds all related workers of M
    For each pair of workers ($w_i$, wj) in Wset(M)
        If org-distance ($w_i$, wj)>threshold, identify as misalignment This approach can be extended. That is, instead of analyzing just one microservice, a pair (or larger set) of microservices can be analyzed. A service mesh can be utilized to identify neighboring microservices of a given microservice. These neighboring microservices can be those that are part of a producer-consumer relationship with the given microservice. A policy can be that workers who work on microservices in a producer-consumer relationship have an organizational distance of 3 or 4, at most. This can indicate that close microservices are developed by teams that have similarly close management.

Such an approach for identifying organizational misalignment can be:
For microservices M1 and M2 that are neighbors in a service mesh
    For each pair of workers ($w_i$, wj), where $w_i$ is in Wset(M1), and $w_j$ is in Wset(M2)
        If org-distance ($w_i$, wj)>threshold, identify as misalignment These misalignments can be resolved by modifying the organizational graph in a way that all policies or constraints are met. For example, given a microservice with broken constraints, a suggestion can be made for creating a new team that will be composed of all the owners of that microservice and be responsible only for that microservice.

An approach for generating a new suggested organizational graph that holds constraints can be to cut off leaf nodes from the organizational graph, where leaf nodes correspond to workers who have no other worker reporting to him or her. These leaf nodes can be called non-connected-workers. Options for dividing non-connected workers between edge managers (managers who have no workers reporting to them after leaf nodes are removed) can be enumerated. For each enumerated option, it can be checked if the option holds all constraints. If the option does hold all constraints, then it is considered a possible solution. This analysis can be performed for a predetermined amount of time, or iterations.

In some examples, this analysis can involve implementing searching techniques like A*, where a solution is iteratively built, and it is determined at each step that constraints hold. In some examples, additional constraints can be added to possible solutions, like that all managers need to have at least one worker reporting to them.

Example Architectures

FIG. 1 illustrates an example system architecture 100 that can facilitate data-driven organization adjustment, in accordance with certain embodiments of this disclosure.

As depicted, system architecture 100 comprises client computer 102, communications network 104, microservices SaaS platform 106, and repository 114. In turn, microservices SaaS platform 106 comprises data-driven organization adjustment component 108, microservice 1 110a, microservice 2 110b, microservice 3 110c, and organization database 112.

Figure 11:
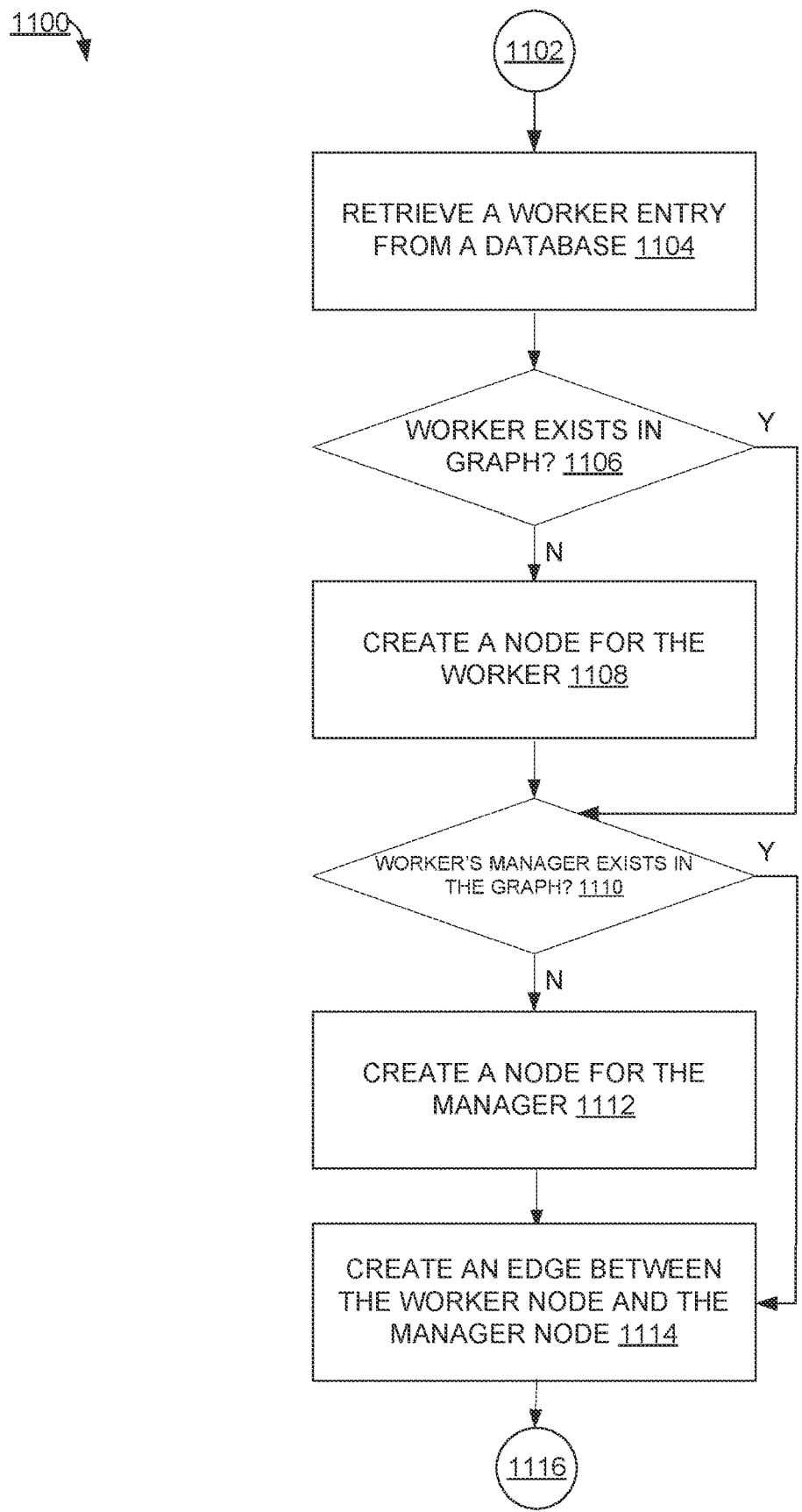
FIG. 11 illustrates an example process flow for determining an organizational graph that can facilitate data-driven organization adjustment, in accordance with certain embodiments of this disclosure.

Each of client computer 102, microservices SaaS platform 106, and repository 114 can be implemented with one or more instances of computer 1102 of FIG. 11. In some examples, microservices SaaS platform 106 comprises a distributed storage system that comprises multiple instances of computer 1502 of FIG. 15. In some examples, each of data-driven organization adjustment component 108, micro service 1 110a, micro service 2 110b, microservice 3 110c, and organization database 112 can be implemented with machine-executable instructions and/or aspects of computer 1502 of FIG. 15.

Communications network 104 can comprise a computer communications network, such as the INTERNET, or an isolated private computer communications network.

Client computer 102 can access microservices SaaS platform 106 via communications network 104. In some examples, client computer 104 can access computer storage resources provided as SaaS by microservices SaaS platform 106. Microservices SaaS platform 106 can provide this SaaS via microservice 1 110a, microservice 2 110b, and microservice 3 110c working in conjunction, similar to system architecture 300 of FIG. 3.

Repository 114 can store one or more code repositories that correspond to a microservice on microservices SaaS platform 106 (e.g., microservice 1 110a). A code repository can comprise compiled and/or uncompiled computer code that is used to create a corresponding microservice. Each separate project on repository 114 (e.g., one for microservice 1 110a, and another for microservice 2 110b) can be referred to as a repository.

Data-driven organization adjustment component 108 can be used to identify an adjustment to an organizational graph of an organization that implements microservices SaaS platform 106. In some examples, data-driven organization adjustment component 108 can analyze the interaction of microservice 1 110a, microservice 2 110b, and microservice 3 110c; who in an organization is associated with each of microservice 1 110a, microservice 2 110b, and microservice 3 110c from repository 114; and the organization as it currently exists from organization database 112. From this analysis, data-driven organization adjustment component 108 can identify an adjustment to the organization's organizational graph, such as to implement policies like that all workers who can modify a given microservice should report to the same manager, or that all managers who have microservices that interact should report to the same person.

Figure 12:
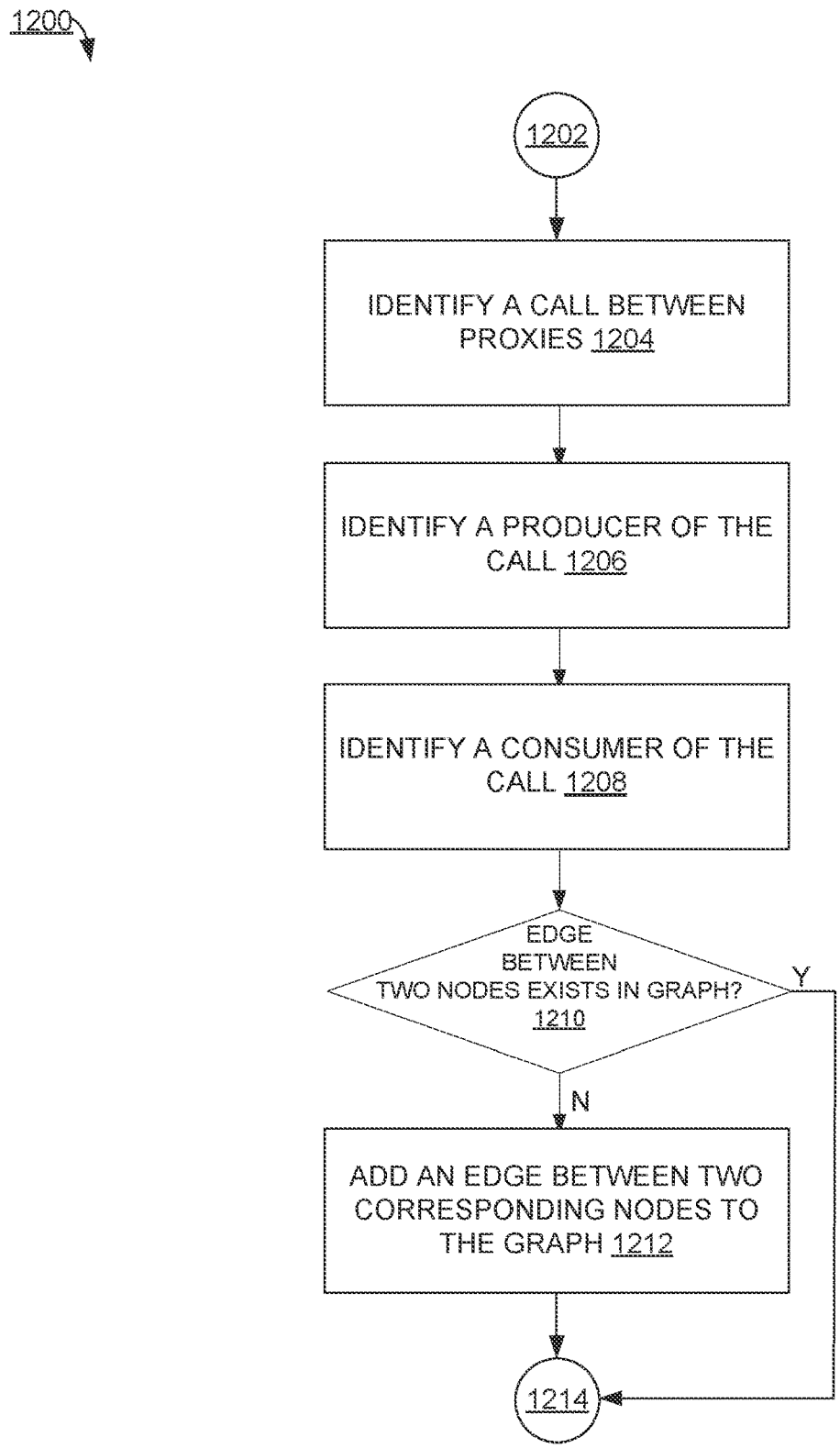
FIG. 12 illustrates an example process flow for determining a service mesh that can facilitate data-driven organization adjustment, in accordance with certain embodiments of this disclosure.
Figure 13:
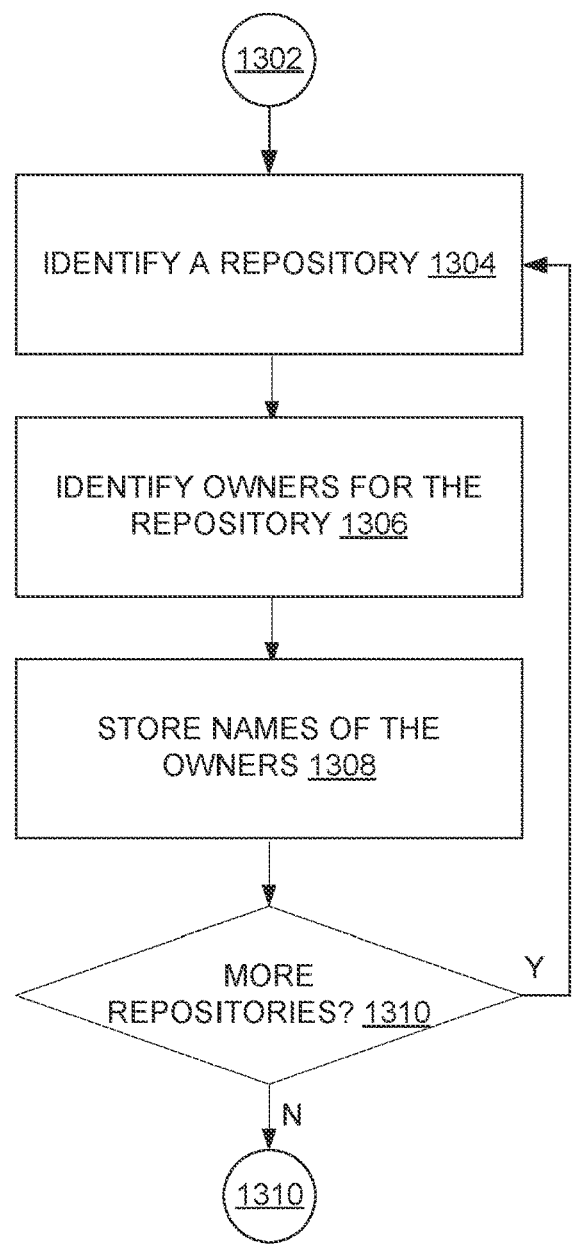
FIG. 13 illustrates an example process flow for determining owners of a microservice that can facilitate data-driven organization adjustment, in accordance with certain embodiments of this disclosure.
Figure 14:
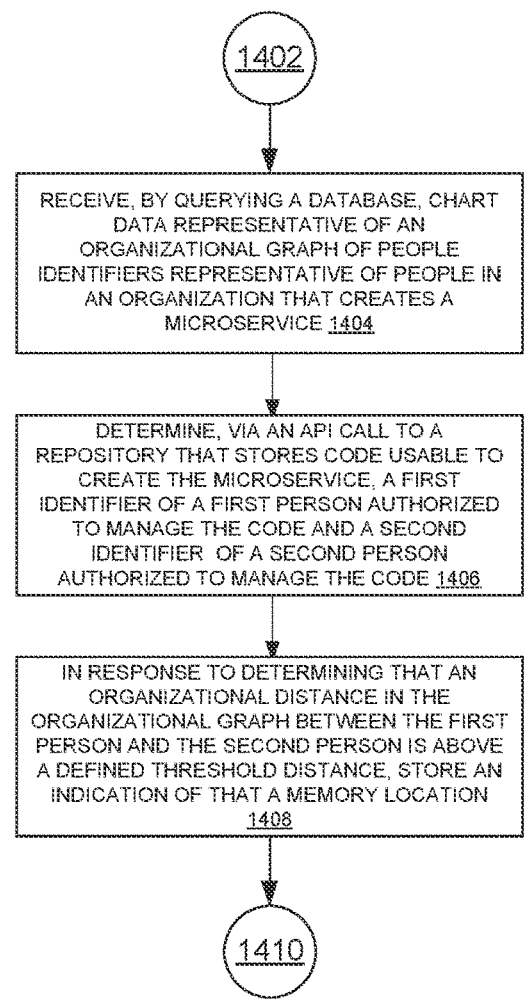
FIG. 14 illustrates an example process flow for data-driven organization adjustment, in accordance with certain embodiments of this disclosure.

In implementing organization adjustment in this manner, data-driven organization adjustment component 108 can implement aspects of process flow 1100 of FIG. 11, process flow 1200 of FIG. 12, process flow 1300 of FIG. 13, and process flow 1400 of FIG. 14.

Figure 2:
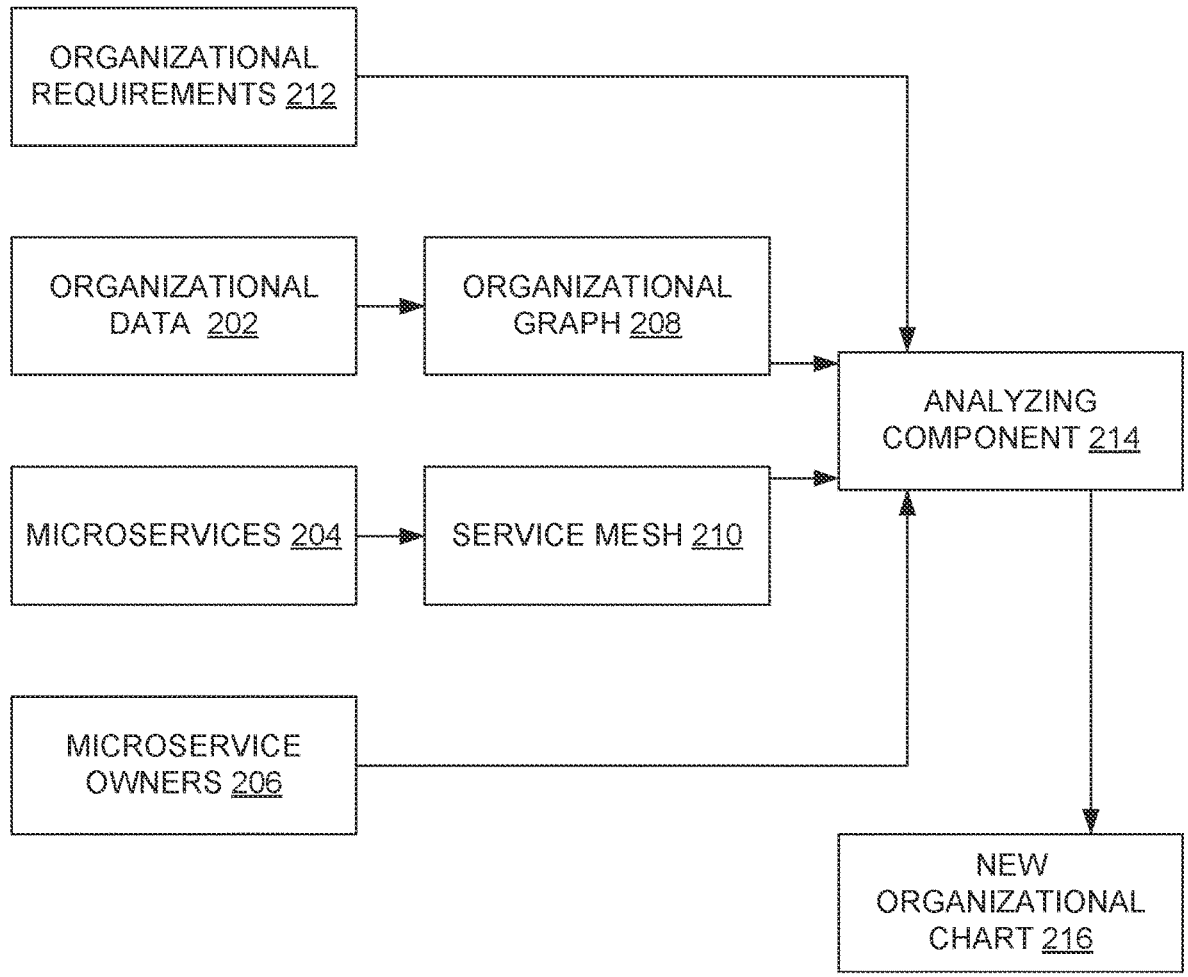
FIG. 2 illustrates another example system architecture that can facilitate data-driven organization adjustment, in accordance with certain embodiments of this disclosure.

FIG. 2 illustrates another example system architecture 200 that can facilitate data-driven organization adjustment, in accordance with certain embodiments of this disclosure. In some examples, system architecture 200 can be similar to a system architecture of data-driven organization adjustment component 108 of FIG. 1, and used by data-driven organization adjustment component 108 to facilitate data-driven organization adjustment.

As depicted, system architecture 200 comprises organizational data 202, microservices 204, microservice owners 206, organizational graph 208, service mesh 210, organizational requirements 212, analyzing component 214, and new organizational chart 216.

Organizational data 202 can be an organization chart determined by data-driven organization adjustment component 108 from data in organization database 112. It can be transformed into organizational graph 208, which can be similar to organizational graph 500 of FIG. 5, and which can depict workers in the organization and their relationships to each other (e.g., that worker A manages worker B).

Microservices 204 can be similar to microservice 1 110a, microservice 2 110b, and microservice 3 110c of FIG. 1. From microservices 204, a service mesh can be determined, similar to microservice graph 400 of FIG. 4 derived from system architecture 300 of FIG. 3.

Microservice owners 206 can be information about which workers in an organization are able to modify or otherwise have ownership of microservices (such as of microservice 1 110a, microservice 2 110b, and microservice 3 110c of FIG. 1). This information can be determined from repository 114 of FIG. 1.

Organizational requirements 212 can be information entered by an administrator that expresses rules for an organizational chart to adhere to. Example rules can be that all workers who can modify a given microservice should report to the same manager, or that all managers who have microservices that interact should report to the same person.

Analyzing component 214 can be implemented with machine-executable instructions and/or aspects of computer 1102 of FIG. 11. Analyzing component can take microservice owners 206, organizational graph 208, service mesh 210, and organizational requirements 212, and from these propose new organizational chart 216.

Figure 3:
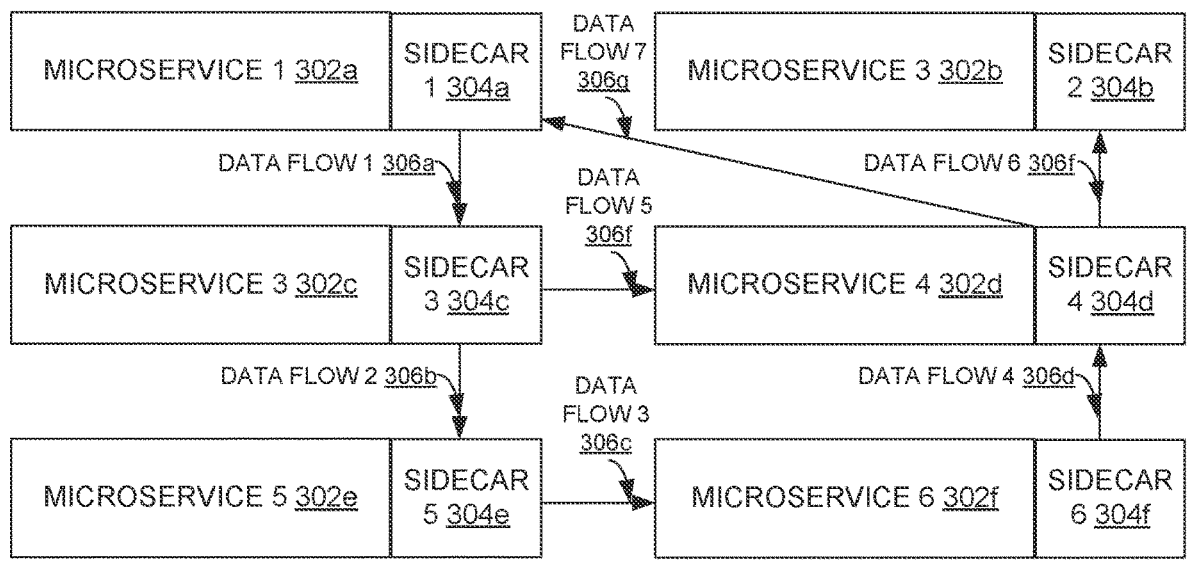
FIG. 3 illustrates an example system architecture of microservices that can facilitate data-driven organization adjustment, in accordance with certain embodiments of this disclosure.

FIG. 3 illustrates an example system architecture 300 of microservices that can facilitate data-driven organization adjustment, in accordance with certain embodiments of this disclosure. In some examples, system architecture 300 can be similar to a system architecture of microservices that execute on microservices SaaS platform 106 of FIG. 1. System architecture 300 can be analyzed to determine whether workers who own each microservice are appropriately placed within an organizational chart.

In some examples, system architecture 300 can be similar to a system architecture of a service mesh of microservice 1 110a, microservice 2 110b, and microservice 3 110c of FIG. 1, and can be controlled by data-driven organization adjustment component 308, which can be similar to data-driven organization adjustment component 108 of FIG. 1.

In some examples, a service mesh does not introduce new functionality into an application's runtime environment because the application already has rules to specify how requests get from point A to point B. A service mesh can differ from a traditional application in that a service mesh can take logic governing service-to-service communication out of individual services, and abstract it to a layer of infrastructure.

In a service mesh, requests can be routed between microservices through proxies in their own infrastructure layer. Individual proxies that make up a service mesh can be referred to as "sidecars," since they can run alongside each service, rather than within a service. Taken together, these sidecar proxies—decoupled from their respective services—can form a mesh network.

In some examples, where a service mesh is created, any logic (via microservices) can be added to the proxy.

As depicted, system architecture 300 comprises microservice 1 302a, microservice 2 302b, microservice 3 302c, microservice 4, 302d, microservice 5 302e, and microservice 6 302f. As depicted, system architecture 300 also comprises sidecar 1 304a (which corresponds to microservice 1 302a), sidecar 2 304b (which corresponds to microservice 2 302b), sidecar 3 304c (which corresponds to microservice 3 302c), sidecar 4 304d (which corresponds to microservice 4 302d), sidecar 5 304e (which corresponds to microservice 5 302e), and sidecar 6 304f (which corresponds to microservice 6 302f). This collection of microservices and sidecars can collectively be considered a service mesh, and can collectively operate as a SaaS product.

As depicted there are also data flows in system architecture 300. These data flows can be used by microservices to communicate, and be made using the microservices corresponding sidecars. As depicted, there are data flow 1 306a, data flow 2 306b, data flow 3 306c, data flow 4 306d, data flow 5 306e, data flow 6 306f, and data flow 7 306g.

Data flow 1 306a is from microservice 1 302a and to microservice 3 302c (via sidecar 1 304a and sidecar 3 304c, respectively). Regarding data flow 1 306a, microservice 1 302a can be said to be the producer, and microservice 302b can be said to be the consumer. Data flow 2 306b is from microservice 3 302c and to microservice 5 302e. Data flow 3 306c is from microservice 5 302e and to microservice 6 302f. Data flow 4 306d is from microservice 6 302f and to microservice 4 302d. Data flow 5 306e is from microservice 3 302c and to microservice 4 302d. Data flow 6 306f is from microservice 4 302d and to microservice 2 302b. Data flow 7 306g is from microservice 4 302d and to microservice 1 302a.

Figure 4:
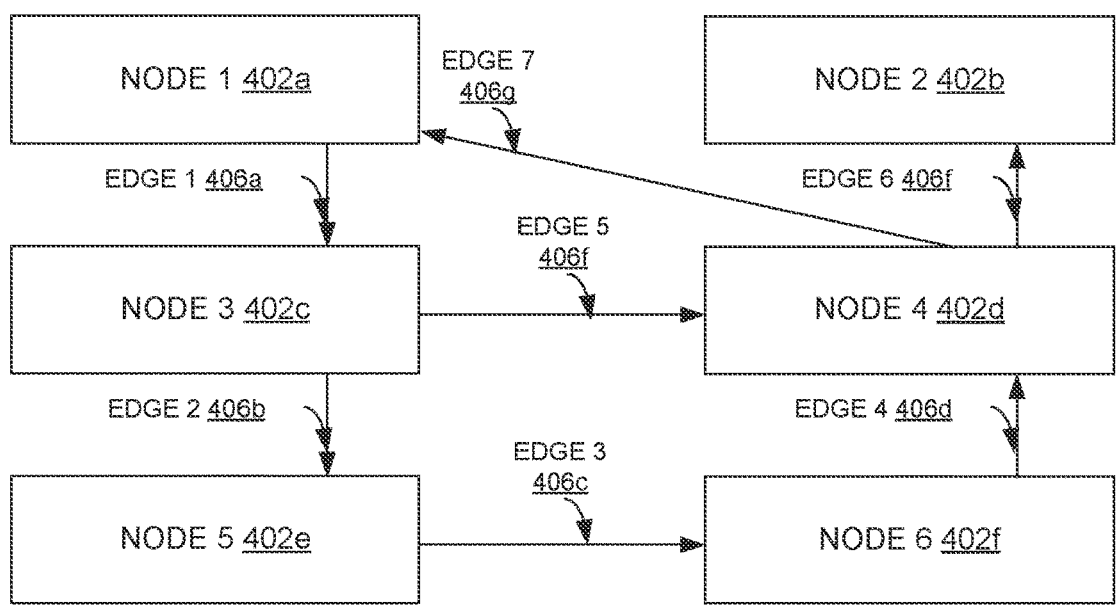
FIG. 4 illustrates an example microservice graph that can facilitate data-driven organization adjustment, in accordance with certain embodiments of this disclosure.

In some examples, a service mesh such as in system architecture 300 can be used to automatically create an API graph dependency, such as microservice graph 400 of FIG. 4.

FIG. 4 illustrates an example microservice graph 400 that can facilitate data-driven organization adjustment, in accordance with certain embodiments of this disclosure. In some examples, data-driven organization adjustment component 408 (which can be similar to data-driven organization adjustment component 108 of FIG. 1) can generate example microservice graph 400 from system architecture 300 of FIG. 3. That is, a structure of microservice graph 400 can be deduced by generating a service mesh between the different microservices of system architecture 300 of FIG. 3. Microservice graph 400 comprises a plurality of nodes and edges that connect the nodes, in contrast to a type of graph where values are plotted in two-dimensional coordinate system.

In an example, a graph of the microservices can be generated based on a structure of API dependencies between the microservices. An approach to generating such an API graph can be utilize tools that adapt a service mesh. A service mesh can describe a network of microservices that make up a distributed application, and interactions between these microservices. As a service mesh grows in size and complexity, it can become harder to understand and manage. There can be tools that allow control over a service mesh, and provide behavioral insights and operational insights over the service mesh as a whole.

A central service can be provided that the proxies can send data to, such as data-driven organization adjustment component 108 of FIG. 1. For example, a first proxy (e.g., sidecar 1 304a of FIG. 3) associated with a first microservice (such as microservice 1 302a of FIG. 3) can relay a call (such as data 306-1) that the first microservice sends to a second microservice (such as microservice 3 302c of FIG. 3) associated with a second proxy (such as sidecar 3 304c of FIG. 3), and this data can also be sent to the central service. The central service can collect this data over time to generate an API graph.

By generating a graph, the central service can form a representation of a network structure. In a graph, a directed edge (u, v) can represent a scenario where microservice v consumes an API from microservice u. Put another way, microservice v can be a consumer and microservice u can be a producer in this relationship. In examples, u and v in the graph can be referred to as nodes of the graph.

Microservice graph 400 can represent a network of a microservices environment. As depicted, microservice graph 400 is composed of six nodes, which each correspond to a microservice of system architecture 300 of FIG. 3. That is, microservice graph 400 comprises node 1 402a (corresponding to microservice 1 302a of FIG. 3), node 2 402b (corresponding to microservice 2 302b of FIG. 3), node 3 402c (corresponding to microservice 3 302c of FIG. 3), node 4 402d (corresponding to microservice 4 302d of FIG. 3), node 5 402e (corresponding to microservice 5 302e of FIG. 3), and node 6 402f (corresponding to microservice 6 302f of FIG. 3).

Microservice graph 400 also comprises a plurality of directed edges between nodes, and these directed edges can correspond to data flow in system architecture 300. Microservice graph 400 comprises directed edge 1 406a (which corresponds to data flow 1 306a of FIG. 3), directed edge 2 406b (which corresponds to data flow 2 306b of FIG. 3), directed edge 3 406c (which corresponds to data flow 3 306c of FIG. 3), directed edge 4 406d (which corresponds to data flow 4 306d of FIG. 3), directed edge 5 406e (which corresponds to data flow 5 306e of FIG. 3), and directed edge 6 406f (which corresponds to data flow 6 306f of FIG. 3).

Figure 5:
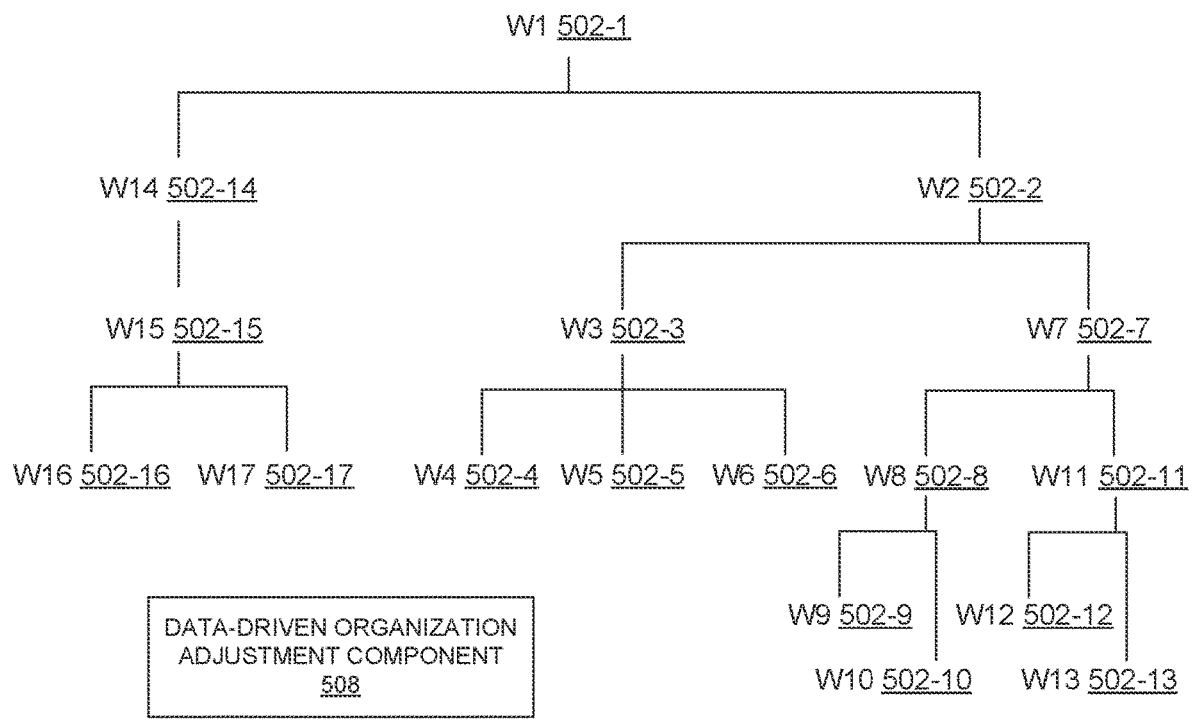
FIG. 5 illustrates an example organizational graph that can facilitate data-driven organization adjustment, in accordance with certain embodiments of this disclosure.

FIG. 5 illustrates an example organizational graph 500 that can facilitate data-driven organization adjustment, in accordance with certain embodiments of this disclosure. In some examples, organizational graph 500 can be generated by data-driven organization adjustment component 504 (which can be similar to data-driven organization adjustment component 108 of FIG. 1) using information accessed from organization database 112.

As depicted, there are 17 workers in organizational graph 500—W1 502-1, W2 502-2, W3 502-3, W4 502-4, W5 502-5, W6 502-6, W7 502-7, W8 502-8, W9 502-9, W10 502-10, W11 502-11, W12 502-12, W13 502-13, W14 502-14, W15 502-15, W16 502-16, and W17 502-17.

Organizational graph 500 illustrates reporting relationships between workers—which workers report to which other workers, or which workers have which workers reporting to them. As depicted, W9 502-9 and W10 502-10 report to W8 502-8; W12 502-12 and W13 502-13 report to W11 502-11; W16 502-16 and W17 502-17 report to W15 502-15; W4 502-4, W5 502-5, and W6 502-6 report to W3 502-3; W8 502-8 and W11 502-11 report to W7 502-7; W15 502-15 reports to W14 502-14; W3 502-3 and W7 502-7 report to W2 502-2; W14 502-14 and W2 502-2 report to W1 502-1; and W1 502-1 reports to no one.

Figure 6:
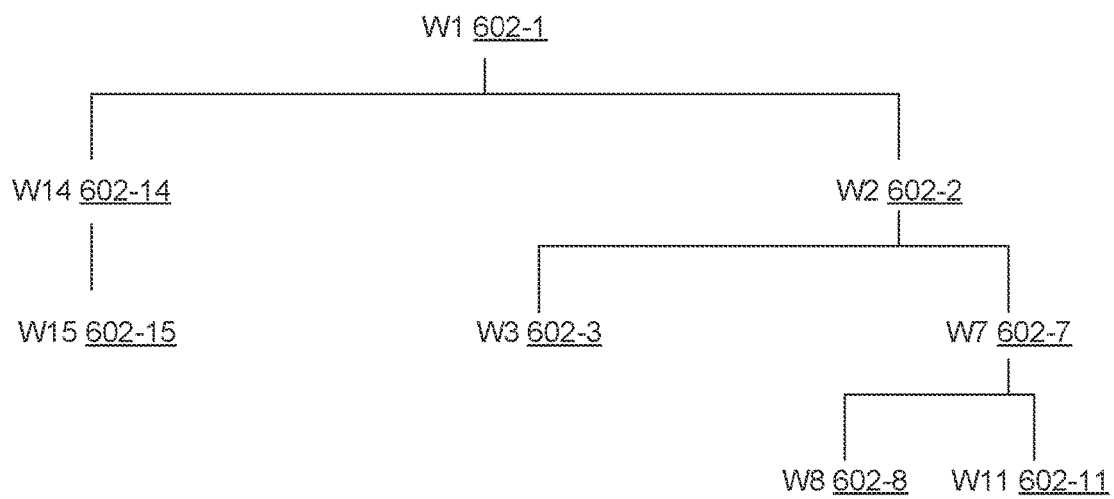
FIG. 6 illustrates a modified example organizational graph that can facilitate data-driven organization adjustment, in accordance with certain embodiments of this disclosure.

FIG. 6 illustrates a modified example organizational graph 600 that can facilitate data-driven organization adjustment, in accordance with certain embodiments of this disclosure. In some examples, data-driven organization adjustment component 604 (which can be similar to data-driven organization adjustment component 108 of FIG. 1) can generate organizational graph 600 using organizational graph 500.

Organizational graph 600 can generally differ from organizational graph 500 in that, organizational graph 600 omits leaf workers that are found in organizational graph 500. A leaf worker can be a worker who is not reported to by another worker. In organizational graph 500, these can be W16 502-16, W17 502-17, W4 502-4, W5 502-5, W6 502-6, W9 502-9, W10 502-10, W12 502-12, and W13 502-13.

Then in this example, each worker represented in organizational graph 600 can have a corresponding worker represented in organizational graph 500. That is, W8 602-8 can correspond to W8 502-8; W11 602-11 can correspond to W11 502-11; W15 602-15 can correspond to W15 502-15; W3 602-3 can correspond to W3 502-3; W7 602-7 can correspond to W7 502-7; W14 602-14 can correspond to W14 502-14; W2 602-2 can correspond to W2 502-2; and W1 602-1 can correspond to W1 502-1.

Those workers who had a worker reporting to them in organizational graph 500 but do not have a worker reporting to them in organizational graph 600 can be referred to as edge managers. Edge managers can be identified, as described with respect to organizational graph 700 of FIG. 7. Permutations of assigning leaf workers to different edge managers in organizational graph 600 can be evaluated to determine whether a given permutation meets all specified constraints. An example of a permutation that is determined to meet all specified constraints is found in organizational graph 800 of FIG. 8.

Figure 7:
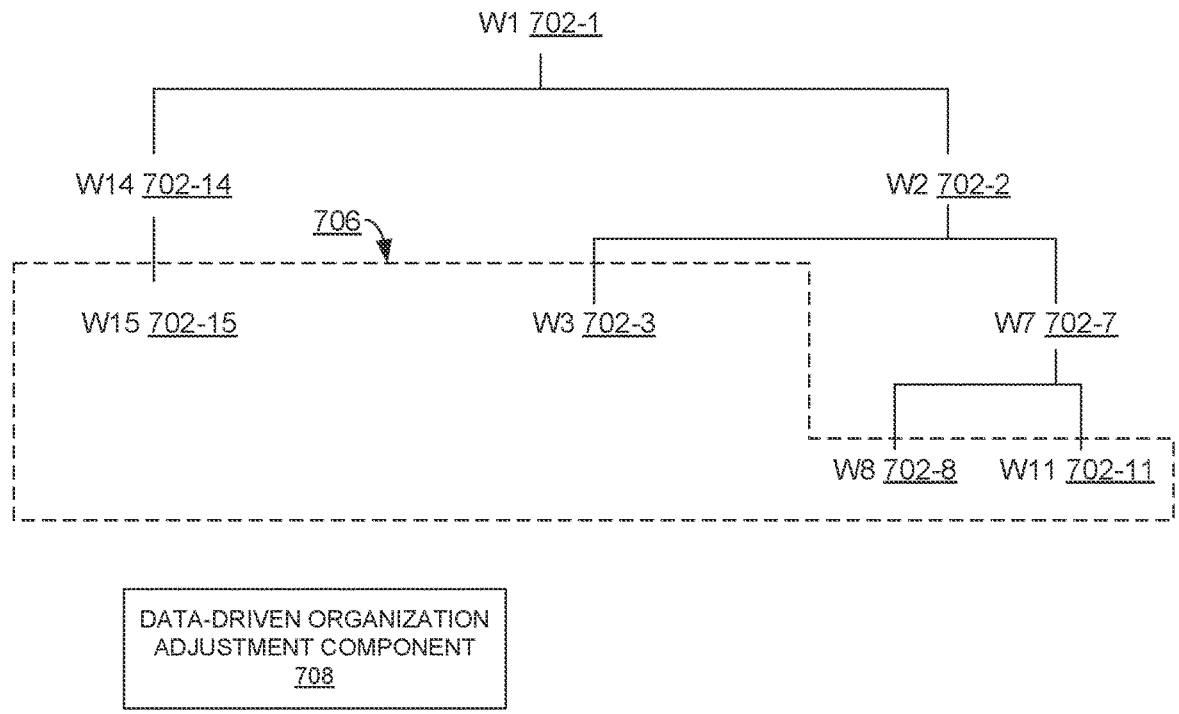
FIG. 7 illustrates another modified example organizational graph that can facilitate data-driven organization adjustment, in accordance with certain embodiments of this disclosure.

FIG. 7 illustrates another modified example organizational graph 700 that can facilitate data-driven organization adjustment, in accordance with certain embodiments of this disclosure. In some examples, data-driven organization adjustment component 704 (which can be similar to data-driven organization adjustment component 108 of FIG. 1) can generate organizational graph 700 using organizational graph 600.

Organizational graph 700 can generally differ from organizational graph 600 in that, organizational graph 700 identifies edge managers present in organizational graph 600. An edge manager can be a manager not reported to by another manager. After leaf workers are pruned in organizational graph 600 relative to organizational graph 500, the edge managers can be those remaining workers who are not reported to by another worker.

In organizational graph 700, these can be W15 702-15, W3 702-3, W8 702-8, and W11 702-11. These workers can be identified as edge managers 706.

Then in this example, each worker represented in organizational graph 700 can have a corresponding worker represented in organizational graph 600. That is, W8 702-8 can correspond to W8 602-8; W11 702-11 can correspond to W11 602-11; W15 702-15 can correspond to W15 602-15; W3 702-3 can correspond to W3 602-3; W7 702-7 can correspond to W7 602-7; W14 702-14 can correspond to W14 602-14; W2 702-2 can correspond to W2 602-2; and W1 702-1 can correspond to W1 602-1.

Permutations of assigning leaf workers to different edge managers can be evaluated to determine whether a given permutation meets all specified constraints. An example of a permutation that is determined to meet all specified constraints is found in organizational graph 800 of FIG. 8.

Figure 8:
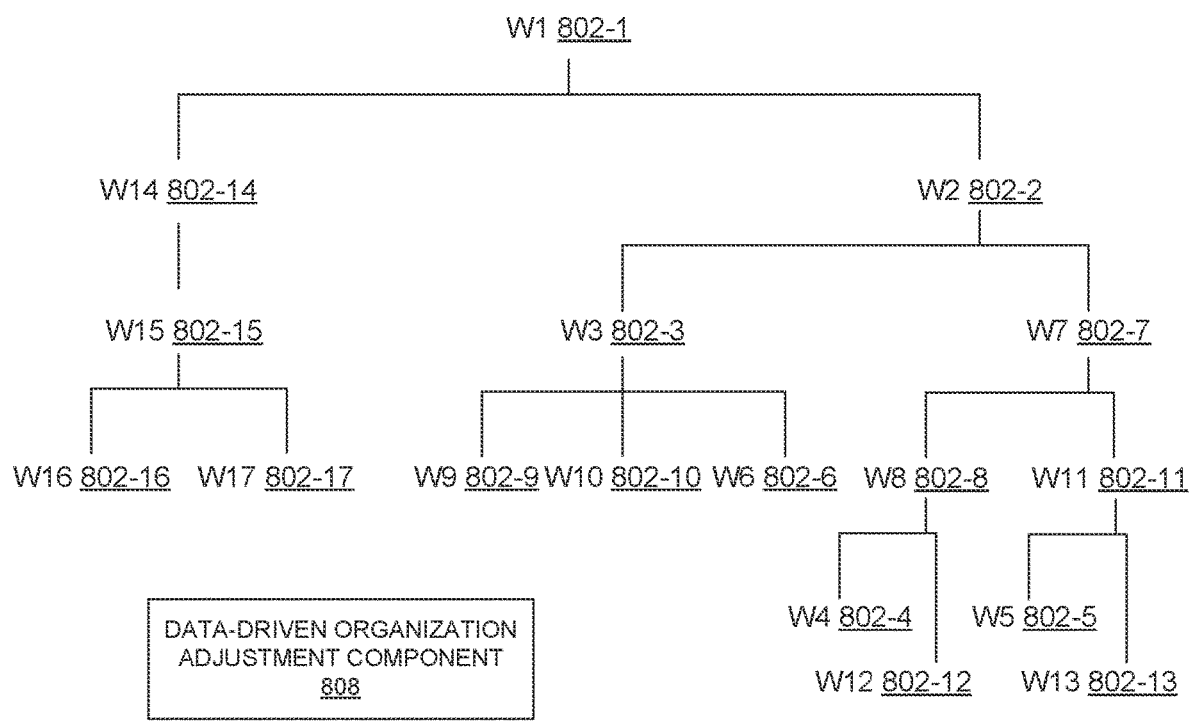
FIG. 8 illustrates another modified example organizational graph that can facilitate data-driven organization adjustment, in accordance with certain embodiments of this disclosure.

FIG. 8 illustrates another modified example organizational graph 800 that can facilitate data-driven organization adjustment, in accordance with certain embodiments of this disclosure. In some examples, data-driven organization adjustment component 704 (which can be similar to data-driven organization adjustment component 108 of FIG. 1) can generate organizational graph 700 using organizational graph 600.

Organizational graph 800 can identify the same workers as organizational graph 500, but in a new organizational order—one that adheres to specified organizational requirements (e.g., organizational requirements 212 of FIG. 2).

As depicted, organizational graph 800 comprises W1 802-1, W2 802-2, W3 802-3, W4 802-4, W5 802-5, W6 802-6, W7 802-7, W8 802-8, W9 802-9, W10 802-10, W11 802-11, W12 802-12, W13 802-13, W14 802-14, W15 802-15, W16 802-16, and W17 802-17, and these workers can correspond to W1 502-1, W2 502-2, W3 502-3, W4 502-4, W5 502-5, W6 502-6, W7 502-7, W8 502-8, W9 502-9, W10 502-10, W11 502-11, W12 502-12, W13 502-13, W14 502-14, W15 502-15, W16 502-16, and W17 502-17 of FIG. 5, respectively.

Then, some leaf workers in organizational graph 800 can report to different managers than in organizational graph 500. That is, W9 802-9, W10 802-10, W4 802-4, W5 802-5, and W6 802-6 can report to different managers relative to organizational graph 500. These different reports can represent a proposed new organizational chart that adheres to specified organizational requirements.

FIG. 9 illustrates an example association 900 of microservices to a particular worker that can facilitate data-driven organization adjustment, in accordance with certain embodiments of this disclosure. In some examples, association 900 can be determined by data-driven organization adjustment component 108 of FIG. 1 to facilitate data-driven organization adjustment.

In association 900, each worker in organizational graph 500 can be identified along with any microservices that that worker manages or otherwise has control over. The nomenclature Mset(X)={Y} can be used, where X identifies a particular worker, and Y identifies any microservices that worker X manages. Y can be a null set, can be one microservice, or can be multiple microservices. For example, MSet(W3)={MS1} indicates that worker W3 manages microservice MS1.

This association can be determined by data-driven organization adjustment component 108 by identifying microservices in a service mesh (e.g., microservice graph 400 of FIG. 4), and querying a repository (e.g., repository 114 of FIG. 1) for the identities of workers who manage a given identified microservice.

FIG. 10 illustrates an example association 1000 of workers to a particular microservice that can facilitate data-driven organization adjustment, in accordance with certain embodiments of this disclosure. In some examples, association 1000 can be determined by data-driven organization adjustment component 108 of FIG. 1 to facilitate data-driven organization adjustment.

In association 1000, each microservice identified in association 900 can be identified here, along with any workers that manage or otherwise have control over that microservice. The nomenclature Wset(X)={Y} can be used, where X identifies a particular microservice, and Y identifies any workers that manage microservice X. Y can be a null set, can be one microservice, or can be multiple microservices. For example, Wset(MS1)={W3, W5,W6} indicates that microservice MS1 is managed by workers W3, W5, and W6.

This association can be determined by data-driven organization adjustment component 108 by processing association 900 to determine a relationship between a given microservice and a given worker.

Association 900 can be thought of as identifying microservices that correspond to a specified worker. Then, association 1000 can map in the other direction and be thought of as identifying workers that correspond to a specified microservice.

A reason for generating association 1000 from association 900 can be that analyzing workers that correspond to a specified microservice can be used in facilitating data-driven organization adjustment. For example, a policy for an organizational chart can be that the workers who correspond to a specified microservice share the same manager. This can be determined by analyzing the workers in association 1000 for a given microservice.

Example Process Flows

FIG. 11 illustrates an example process flow 1100 for determining an organizational graph that can facilitate data-driven organization adjustment, in accordance with certain embodiments of this disclosure. In some examples, aspects of process flow 1100 can be implemented by data-driven organization adjustment component 108 of FIG. 1, or computing environment 1500 of FIG. 15.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with aspects of one or more of process flow 1200 of FIG. 12, process flow 1300 of FIG. 13, and/or process flow 1400 of FIG. 14.

Process flow 1100 begins with 1102, and moves to operation 1104. Operation 1104 depicts retrieving a worker entry from a database. This can comprise data-driven organization adjustment component 108 of FIG. 1 querying organization database 112 for information about one (or more workers) in the organization. After operation 1104, process flow 1100 moves to operation 1106.

Operation 1106 depicts determining whether a worker exists in a graph. Data-driven organization adjustment component 108 can maintain a graph that represents an organizational chart. This graph can comprise nodes each represent a worker, and edges between the nodes that represent a relationship between workers of two nodes (e.g., that one worker is a manager of another worker). Determining whether a worker exists in a graph can comprise determining whether the graph has a node that represents that worker.

Where it is determined in operation 1106 that the worker exists in the graph, process flow 1100 moves to 1110. Instead, where it is determined in operation 1106 that the worker does not exist in the graph, process flow 1100 moves to operation 1108.

Operation 1108 is reached from operation 1106 where it is determined that the worker does not exist in the graph. Operation 1108 depicts creating a node for the worker. This can comprise adding a new node to the graph, and storing an indication that this new node corresponds to the worker. After operation 1108, process flow 1100 moves to operation 1110.

Operation 1110 is reached from operation 1106 where it is determined that the worker exists in the graph, or from operation 1108. Operation 1110 depicts determining whether the worker's manager exists in the graph. In some examples, the worker entry of operation 1104 can identify the worker's manager (if the worker has a manager). In some examples, operation 1110 can be implemented in a similar manner as operation 1106, but for the manager rather than the worker.

Where it is determined in operation 1110 that the worker's manager exists in the graph, process flow 1100 moves to 1114. Instead, where it is determined in operation 1110 that the worker's manager does not exist in the graph, process flow 1100 moves to operation 1112.

Operation 1112 is reached from operation 1110 where it is determined that the worker's manager does not exist in the graph. Operation 1112 depicts creating a node for the manager. In some examples, operation 1112 can be implemented in a similar manner as operation 1108, but for the manager rather than the worker. After operation 1112, process flow 1100 moves to operation 1114.

Operation 1114 is reached from operation 1110 where it is determined that the worker's manager appears in the graph, or from operation 1112. Operation 1114 depicts creating an edge between the worker node and the manager node. In some examples, creating an edge can comprise storing an indication that the worker node and the manager node are connected, along with an indication of which node corresponds to the manager for the other node. After operation 1114, process flow 1100 moves to operation 1116, where process flow 1100 ends.

The operations of process flow 1100 can be repeated for each worker identified in the database of operation 1104 to produce an organizational graph that identifies the workers of their organization (as nodes of the graph) and their managerial hierarchy relative to each other (as edges of the graph).

FIG. 12 illustrates an example process flow 1200 for determining a service mesh that can facilitate data-driven organization adjustment, in accordance with certain embodiments of this disclosure. In some examples, aspects of process flow 1200 can be implemented by data-driven organization adjustment component 108 of FIG. 1, or computing environment 1500 of FIG. 15.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with aspects of one or more of process flow 1100 of FIG. 11, process flow 1300 of FIG. 13, and/or process flow 1400 of FIG. 14.

Process flow 1200 begins with 1202, and moves to operation 1204. Operation 1204 depicts identifying a call between proxies. In some examples, data-driven organization adjustment component 108 of FIG. 1 can be sent a copy of a call made between two proxies, such as between sidecar 1 304*a* and sidecar 2 304*b* of FIG. 3. When sidecar 1 304*a* sends data flow 1 306*a* to sidecar 2 304*b*, sidecar 1 304*a* can also send a copy of data flow 1 306*a* to data-driven organization adjustment component 108 of FIG. 1.

In other examples, data-driven organization adjustment component 108 of FIG. 1 can examine the microservices it controls to determine what calls those microservices can or will make when the microservices are in operation as part of a SaaS offering. After operation 1204, process flow 1200 moves to operation 1206.

Operation 1206 depicts identifying a producer of the call. A producer of the call can be the microservice that originates the call. Continuing with the example of operation 1204, this can be microservice 1 302*a* of FIG. 3, which originates data flow 1 306*a*. The producer of the call can be identified from a known part of the call itself. After operation 1206, process flow 1200 moves to operation 1208.

Operation 1208 depicts identifying a consumer of the call. A consumer of the call can be the microservice that receives the call. Continuing with the example of operation 1204, this can be microservice 3 302*c* of FIG. 3, which receives data flow 1 306*a*. The receiver of the call can be identified from a known part of the call itself. After operation 1208, process flow 1200 moves to operation 1210.

Operation 1210 depicts determining whether an edge between two corresponding nodes exists in a graph. That is, operation 1210 can comprise determining whether a graph (e.g., microservice graph 400 of FIG. 4) has such an edge.

Where it is determined in operation 1210 that an edge between two corresponding nodes exists in the graph, process flow moves to 1214, where process flow 1200 ends. Instead, where it is determined in operation 1210 that an edge between two corresponding nodes does not exist in the graph, process flow moves to operation 1212.

Operation 1212 is reached from operation 1210 where it is determined in operation 1210 that an edge between two corresponding nodes does not exist in the graph. Operation 1212 depicts adding an edge between two corresponding nodes to the graph.

In examples where one or more of the nodes also does not exist in the graph, operation 1212 can comprise adding the one or more nodes to the graph. Where the producer of the call is microservice 1 302a and the consumer is microservice 3 302c, this can comprise determining whether the graph already contains corresponding nodes—e.g., node 1 402a and node 3 402c of FIG. 4.

Using the example of microservice graph 400 of FIG. 4, if edge 406a has not yet been added to microservice graph 400, then it can be added to microservice graph 400. In this manner, a graph that represents a service mesh of a set of microservices of a SaaS offering can be built by analyzing the calls made among those microservices.

By performing multiple iterations of process flow 1200 as multiple calls are made between microservices, a service mesh graph can be created that represents the corresponding microservice system architecture.

After operation 1212, process flow 1200 moves to 1214, where process flow 1200 ends.

FIG. 13 illustrates an example process flow 1300 for determining owners of a microservice that can facilitate data-driven organization adjustment, in accordance with certain embodiments of this disclosure. In some examples, aspects of process flow 1300 can be implemented by data-driven organization adjustment component 108 of FIG. 1, or computing environment 1500 of FIG. 15.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with aspects of one or more of process flow 1100 of FIG. 11, process flow 1200 of FIG. 12, and/or process flow 1400 of FIG. 14.

Process flow 1300 begins with 1302, and moves to operation 1304. Operation 1304 depicts identifying a repository. This can be repository 114 of FIG. 1, and be determined based on a stored indication accessible by data-driven organization adjustment component 108 that indicates where a repository that corresponds to a microservice (e.g., microservice 1 110a) exists. After operation 1304, process flow 1300 moves to operation 1306.

Operation 1306 depicts identifying owners for the repository. This can comprise data-driven organization adjustment component 108 of FIG. 1 making an API call to repository 114 for the owners of the repository that correspond to the microservice. After operation 1306, process flow 1300 moves to operation 1308.

Operation 1308 depicts storing names of the owners. This can comprise data-driven organization adjustment component 108 of FIG. 1 storing the names of the owners in a computer memory of microservices SaaS platform 106. After operation 1308, process flow 1300 moves to operation 1310.

Operation 1310 depicts determining whether there are more repositories. In some examples, this can comprise data-driven organization adjustment component 108 of FIG. 1 determining whether there is another microservice on microservices SaaS platform 106 that has a repository that is still to be analyzed. Where it is determined in operation 1310 that there are more repositories, process flow 1300 moves to operation 1304. Instead, where it is determined in operation 1310 that there are not more repositories, process flow 1300 moves to 1312, where process flow 1300 ends.

FIG. 14 illustrates an example process flow 1400 for data-driven organization adjustment, in accordance with certain embodiments of this disclosure. In some examples, aspects of process flow 1400 can be implemented by data-driven organization adjustment component 108 of FIG. 1, or computing environment 1500 of FIG. 15.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with aspects of one or more of process flow 1100 of FIG. 11, process flow 1200 of FIG. 12, and/or process flow 1300 of FIG. 13.

Process flow 1400 begins with 1402, and moves to operation 1404. Operation 1404 depicts receiving, by querying a database, chart data representative of an organizational graph of people identifiers representative of people in an organization that creates a microservice.

In some examples, operation 1404 comprises determining, based on information obtained from a data store, chart data representative of an organizational graph of people in an organization that produces a microservice.

In some examples, an entry of the organizational graph in the data store identifies a first member of the organization and a second member of the organization to whom the first member of the organization reports. That is, an entry for a worker can also identify the person who the worker reports to.

In some examples, operation 1404 comprises determining, based on first information from an executable code repository that stores executable code corresponding to a microservice, a first identifier of a first person who manages the executable code and a second identifier of a second person who manages the executable code.

In some examples, operation 1404 comprises determining the first identifier associated with the first person and the second identifier associated with the second person from the database. That is an organizational graph can have an identifier for a person (e.g., username "jdoe").

In some examples, operation 1404 comprises creating an association between the organizational graph and the microservice based on the first identifier of the first person being present in the organizational graph and the first identifier of the first person being present in the code repository. That is, the identifier for the person identified in an organizational graph can be correlated with that same identifier for the person as an owner of the micro service in the repository.

In some examples, the microservice has an identifier that identifies the microservice, and operation 1404 comprises identifying the executable code used to create the microservice in the executable code repository based on the identifier of the microservice. That is, the microservice can have an identifier in the service mesh, and that same identifier can be used for the microservice in the repository. In some examples, the identifier of the microservice comprises a name of the microservice.

In some examples, the organizational graph comprises a graph that comprises nodes and edges corresponding to the people and relationships among the people. That is, an organizational graph can be a graph comprising nodes and edges in contrast to a graph that plots data, such as in a Cartesian coordinate system.

In some examples, the organizational distance in the organizational graph between the first person and the second person comprises a shortest undirected path between nodes corresponding to the first person and the second person in the graph. For instance, two workers who share a manager can be considered to have an organizational distance of two, because a path between the workers' nodes goes through the manager's node. Similarly, an organizational distance between a worker and his or her manager can be one.

After operation 1404, process flow 1400 moves to operation 1406.

Operation 1406 depicts determining, by making an application programming interface call to a code repository that stores computer code usable to create the microservice, a first identifier of the people identifiers associated with a first person who is authorized to manage the computer code and a second identifier of the people identifiers associated with a second person who is authorized to manage the computer code.

In some examples, operation 1406 comprises determining, from an executable instruction repository that stores computer executable instructions used to create the microservice, a first identifier of a first person who manages the computer executable instructions and a second identifier of a second person who manages the computer executable instructions.

In some examples, operation 1406 comprises determining, based on second information from a remote data store, chart data representative of an organizational graph of people in an organization, the organizational graph identifying at least the first person and the second person.

In some examples, the code repository stores the computer code usable to create microservices that comprises the microservice. In such examples, operation 1406 can comprise determining, from the code repository, a first set of the microservices authorized to be managed by the first person, and a second set of the microservices authorized to be managed by the second person. This can comprise determining a Mset( ) as described with respect to FIG. 9.

In some examples, the executable code repository stores the executable code used to create a group of microservices that comprises the microservice, and operation 1406 comprises determining, from the executable code repository, a first subgroup of the group of microservices managed by the first person, and a second subgroup of the group of microservices managed by the second person. This can comprise determining a Mset( ) as described with respect to FIG. 9.

In some examples, operation 1406 comprises determining, from the first set of the microservices, and from the second set of the microservices, a set of the people identifiers representative of people who are authorized to manage the microservice. This can comprise determining a Wset( ) as described with respect to FIG. 10.

In some examples, operation 1406 comprises determining, from the first subgroup of the group of microservices managed by the first person, and from the second subgroup of the group of microservices managed by the second person, a group of people who manage the microservice. This can comprise determining a Wset( ) as described with respect to FIG. 10.

In some examples, operation 1406 comprises determining that there is an organizational misalignment where two people identifiers in the set of the people identifiers are representative of two people who are separated by at least the defined threshold distance in the organizational graph. That is, it can be determined that an organizational chart does not meet a policy, according to a misalignment-determination analysis.

In some examples, the microservices comprise a first microservice and a second microservice, the first microservice and the second microservice exchange communications, a third identifier of the people identifiers is associated with a third person who is authorized to manage the first microservice, and a fourth identifier of the people identifiers is associated with a fourth person who is authorized to manage the second microservice. In such examples, operation 1406 can comprise determining that there is an organizational misalignment where the third person and the fourth person are separated by at least the defined threshold distance in the organizational graph. That is, it can be determined that an organizational chart does not meet a policy, according to an extended misalignment-determination analysis.

In some examples, operation 1406 comprises determining, based on communications between the microservices of a group of microservices that includes the microservice, a topology of the group of microservices. That is, a service mesh for the microservices can be determined.

In some examples, the topology of the group of microservices is represented as a graph, wherein nodes in the graph represent the group of microservices, and wherein edges in the graph represent communications between the group of microservices. Similar to an organizational graph, this graph comprising nodes and edges can be considered in contrast to a graph that plots data, such as in a Cartesian coordinate system.

After operation 1406, process flow 1400 moves to operation 1408.

Operation 1408 depicts, in response to determining that an organizational distance in the organizational graph between the first person and the second person is above a defined threshold distance, storing an indication that the organizational distance between the first person and the second person is above the defined threshold distance in a memory location.

In some examples, operation 1408 comprises, in response to determining that an organizational distance in the organizational graph between the first person and the second person is above a predetermined threshold distance, generating an indication that there is an organizational misalignment. In some examples, operation 1408 comprises determining that there is the organizational misalignment as a result of two people in the group of people who manage the microservice being determined to be separated by at least the threshold distance in the organizational graph.

In some examples, the predetermined threshold distance is predetermined as a cutoff to indicate whether the first person and the second person share a manager in the organizational graph. That is, the predetermined threshold distance can correspond to how closely two workers work together based on the organizational chart.

After operation 1408, process flow 1400 moves to 1410, where process flow 1400 ends.

Example Operating Environment

Figure 15:
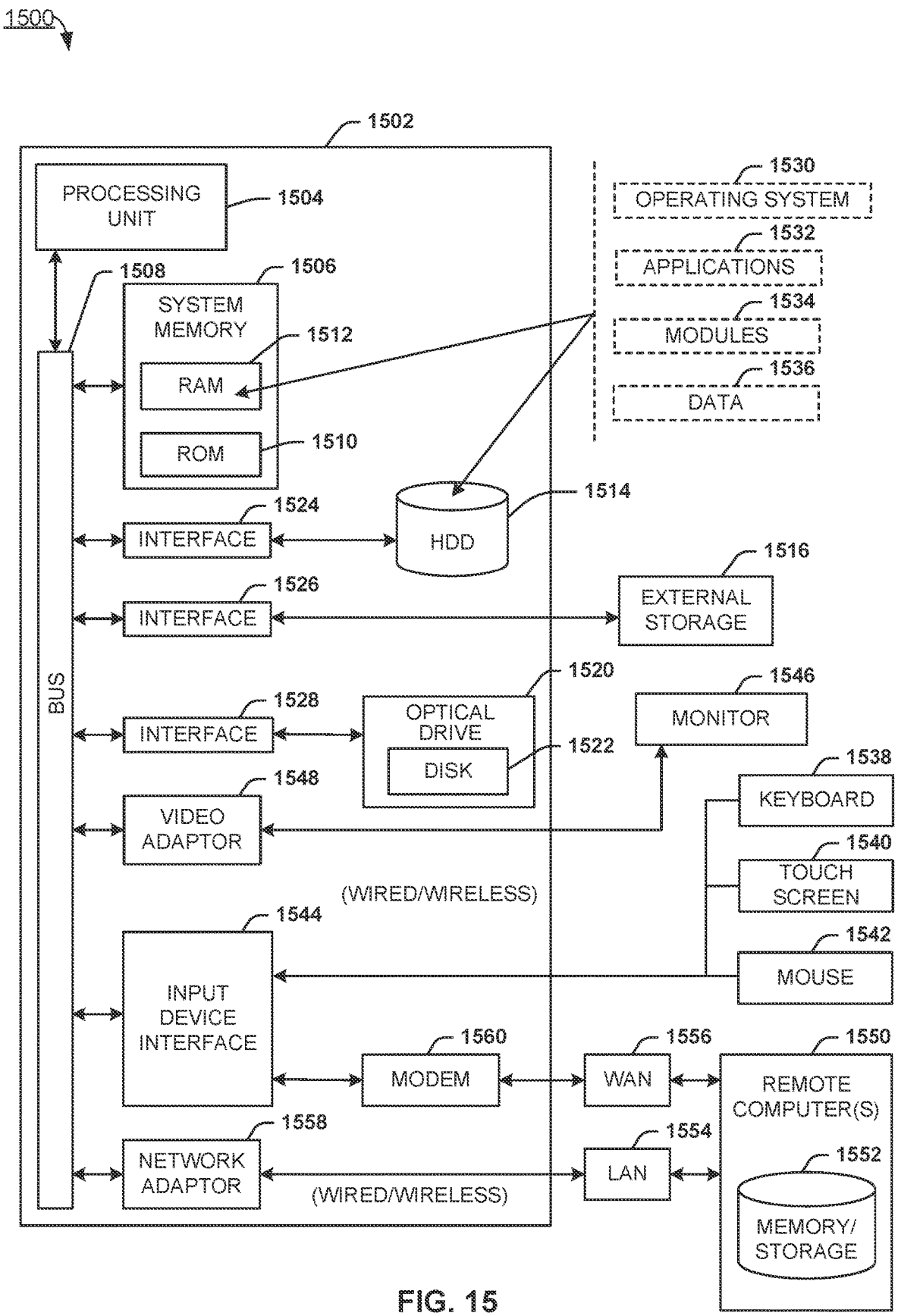
FIG. 15 illustrates an example block diagram of a computer operable to execute certain embodiments of this disclosure.

In order to provide additional context for various embodiments described herein, FIG. 15 and the following discussion are intended to provide a brief, general description of a suitable computing environment 1500 in which the various embodiments of the embodiment described herein can be implemented.

For example, aspects of computing environment 1500 can be used to implement aspects of client computer 102, microservices SaaS platform 106, data-driven organization adjustment probabilistic chaos component 108, microservice 1 110a, microservice 2 110b, and microservice 3 110c of FIG. 1, organization database 112, and/or repository 114. In some examples, computing environment 1500 can implement aspects of the process flows of FIGS. 11-14 to facilitate data-driven organizational adjustment.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples, and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
   determining, by querying a database, a first graph data structure representative of an organizational graph of people identifiers representative of people in an organization that creates a set of microservices, wherein respective first nodes of the first graph data structure represent respective people identifiers of the people identifiers, and wherein respective first edges of the first graph data structure represent respective organizational hierarchies of the organization;
   determining, by analyzing application programming interface calls between respective microservices of the set of microservices, a second graph data structure representation of an architecture of the set of microservices, wherein respective second nodes of the first graph data structure represent the respective microservices, and wherein respective second edges of the first graph data structure represent respective dependencies between the respective microservices;
   mapping the first graph data structure to the second graph data structure, by making an application programming interface call to a code repository that stores computer code usable to create the microservice, wherein the mapping comprises determining a first identifier of the people identifiers associated with a first person who is authorized to manage the computer code and a second identifier of the people identifiers associated with a second person who is authorized to manage the computer code, wherein the determining is based on performing a graphical analysis over the second graph data structure, and wherein a result of the graphical analysis identifies an application programming interface dependency of the application programming interface dependencies between a first microservice of the set of the microservices that is authorized to be managed by the first person and a second microservice of the set of the microservices that is authorized to be managed by the second person; and
   in response to determining that an organizational distance in the organizational graph between the first person and the second person is above a defined threshold distance, storing an indication that there is an organizational misalignment that corresponds to the first microservice and the second microservice in a memory location.

2. The system of claim 1, wherein the code repository stores the computer code usable to create the set of microservices, and wherein the operations further comprise:
   determining, from the code repository, a first subset of the set of microservices authorized to be managed by the first person, and a second subset of the set of microservices authorized to be managed by the second person, wherein the first subset of microservices comprises the first microservice, and wherein the second subset of microservices comprises the second microservice.

3. The system of claim 2, wherein the operations further comprise:
   determining, from the first subset of the set of microservices, and from the second subset of the set of microservices, a set of the people identifiers representative of people who are authorized to manage the microservice.

4. The system of claim 3, wherein the organizational misalignment is a first organizational misalignment, and wherein the operations further comprise:
   determining that there is a second organizational misalignment regarding the set of microservices where two people identifiers in the set of the people identifiers are representative of two people who are separated by at least the defined threshold distance in the organizational graph.

5. The system of claim 3, wherein the organizational misalignment is a first organizational misalignment, and wherein the first microservice and the second microservice exchange communications, wherein a third identifier of the people identifiers is associated with a third person who is authorized to manage the first microservice, wherein a fourth identifier of the people identifiers is associated with a fourth person who is authorized to manage the second microservice, and wherein the operations further comprise:
   determining that there is a second organizational misalignment where the third person and the fourth person are separated by at least the defined threshold distance in the organizational graph.

6. The system of claim 1, wherein the determining of the first graph data structure comprises:
   determining the first identifier associated with the first person and the second identifier associated with the second person from the database.

7. The system of claim 6, wherein the mapping of the first graph data structure to the second graph data structure comprises:
   creating an association between the organizational graph first graph data structure and the microservice based on the first identifier of the first person being present in the organizational graph and the first identifier of the first person being present in the code repository.

8. A method, comprising:
   determining, by a system comprising a processor, and based on information obtained from a data store, a first graph data structure representative of an organizational graph of people in an organization that produces a microservice;
   determining, by the system, a second graph data structure representative of an architecture of a group of microservices that comprises the microservice, and based on analyzing application programming interface calls between respective microservices of the group of microservices;
   mapping, by the system, and from an executable instruction repository that stores computer executable instructions used to create the microservice, the first graph data structure with the second graph data structure, wherein the mapping comprises determining a first identifier of a first person who manages the computer executable instructions and a second identifier of a second person who manages the computer executable instructions based on performing a graphical analysis of application programming interface dependencies of the computer executable instructions; and
   in response to determining that an organizational distance in the organizational graph between the first person and the second person is above a predetermined threshold distance, generating, by the system, an indication that there is an organizational misalignment.

9. The method of claim 8, wherein an entry in the data store that corresponds to the first graph data structure identifies a first member of the organization and a second member of the organization to whom the first member of the organization reports.

10. The method of claim 8, wherein the first graph data structure comprises nodes and edges corresponding to the people and relationships among the people.

11. The method of claim 10, wherein the organizational distance in the organizational graph between the first person and the second person comprises a shortest undirected path between nodes of the nodes that correspond to the first person and the second person in the graph.

12. The method of claim 8, further comprising:
   determining, by the system and based on communications between microservices of a group of microservices that includes the microservice, a topology of the group of microservices, and wherein the second graph data structure comprises the topology of the group of microservices.

13. The method of claim 12, wherein nodes in the second graph data structure represent the group of microservices, and wherein edges in the second graph data structure represent communications between the group of microservices.

14. The method of claim 8, wherein the predetermined threshold distance is predetermined as a cutoff to indicate whether the first person and the second person share a manager in the organizational graph.

15. A non-transitory computer-readable medium comprising instructions that, in response to execution, cause a system comprising a processor to perform operations, comprising:
   determining, based on first information from an executable code repository that stores executable code corresponding to a microservice,
      based on a first graph data structure that represents an organizational graph of people in an organization, and
      based on performing a graphical analysis over application programming interface dependencies of the executable code to produce a second graph data structure,
   a first identifier of a first person who manages the executable code and a second identifier of a second person who manages the executable code,
   wherein the organizational graph identifies at least the first person and the second person, and
      wherein the determining is performed based on mapping the first graph data structure and the second graph data structure; and
   in response to determining that an organizational distance in the organizational graph between the first person and the second person satisfies a function with respect to a threshold distance, storing an indication that there is an organizational misalignment.

16. The non-transitory computer-readable medium of claim 15, wherein the microservice has an identifier that identifies the microservice, and wherein the operations further comprise:
   identifying the executable code used to create the microservice in the executable code repository based on the identifier of the microservice.

17. The non-transitory computer-readable medium of claim 16, wherein the identifier of the microservice comprises a name of the microservice.

18. The non-transitory computer-readable medium of claim 15, wherein the executable code repository stores the executable code used to create a group of microservices that comprises the microservice, and wherein the operations further comprise
   determining, from the executable code repository, a first subgroup of the group of microservices managed by the first person, and a second subgroup of the group of microservices managed by the second person.

19. The non-transitory computer-readable medium of claim 18, wherein the operations further comprise:
   determining, from the first subgroup of the group of microservices managed by the first person, and from the second subgroup of the group of microservices managed by the second person, a group of people who manage the microservice.

20. The non-transitory computer-readable medium of claim 19, wherein the organizational misalignment is a first organizational misalignment, and wherein the operations further comprise:
   determining that there is a second organizational misalignment as a result of two people in the group of people who manage the microservice being determined to be separated by at least the threshold distance in the organizational graph.

* * * * *